No. 651,880. Patented June 19, 1900.
H. McCRORY & F. B. HINKSON.
STREET CLEANER.
(Application filed July 8, 1899.)

(No Model.) 2 Sheets—Sheet 1.

Witnesses
F. W. Riley,
Chas. E. Brock

Inventors
H. McCrory,
F. B. Hinkson,
by _____ Attorneys

No. 651,880. Patented June 19, 1900.
H. McCRORY & F. B. HINKSON.
STREET CLEANER.
(Application filed July 8, 1899.)
(No Model.) 2 Sheets—Sheet 2.
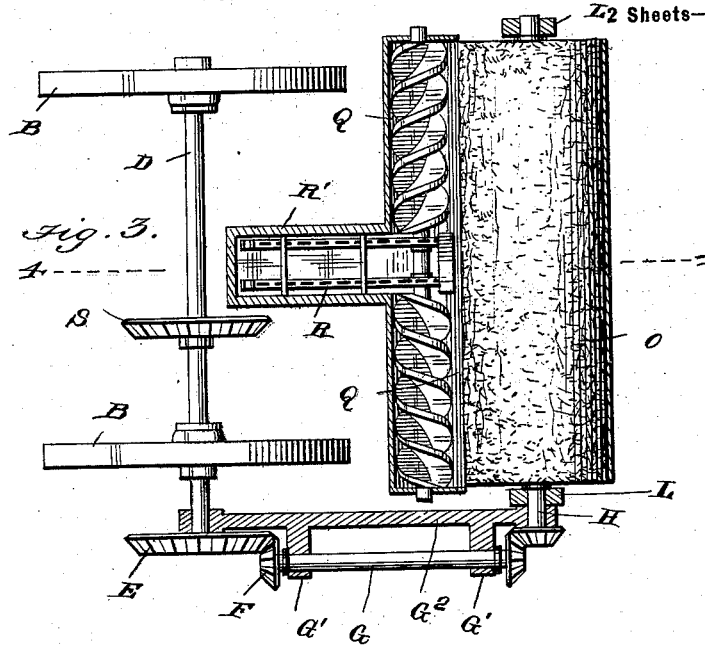
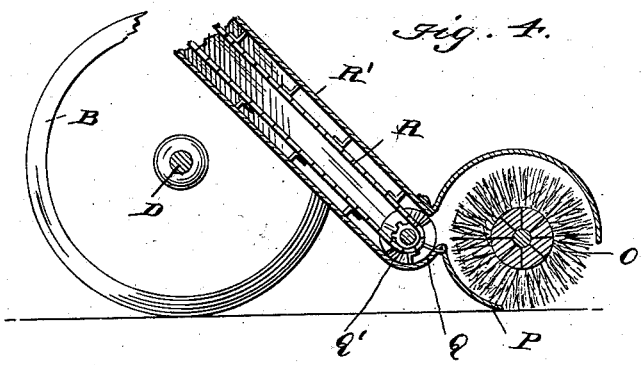
Inventors
H. McCrory,
F. B. Hinkson,

UNITED STATES PATENT OFFICE.

HENRY McCRORY, OF BRADDOCK, AND FRANK B. HINKSON, OF NEW CASTLE, PENNSYLVANIA, ASSIGNORS OF ONE-HALF TO WILLIAM J. VANCE AND GEORGE J. VOGEL, OF ALLEGHENY COUNTY, PENNSYLVANIA.

STREET-CLEANER.

SPECIFICATION forming part of Letters Patent No. 651,880, dated June 19, 1900.

Application filed July 8, 1899. Serial No. 723,209. (No model.)

*To all whom it may concern:*

Be it known that we, HENRY MCCRORY, residing in Braddock, in the county of Allegheny, and FRANK B. HINKSON, residing in New Castle, in the county of Lawrence, State of Pennsylvania, citizens of the United States, have invented a new and useful Improvement in Street-Cleaners, of which the following is a specification.

This invention relates generally to street-sweepers, and more particularly to a combined street-sweeper and dirt-remover, the object being to provide a simple and efficient construction adapted to be attached to any construction of cart or wagon and which can be drawn or propelled by any suitable means and will operate to thoroughly clean the surface traversed and simultaneously collect or remove the dirt swept by the brush.

With these objects in view the invention consists in the peculiar construction of the various parts and in their novel combination or arrangement, all of which will be fully described hereinafter and pointed out in the claim.

Figure 1:
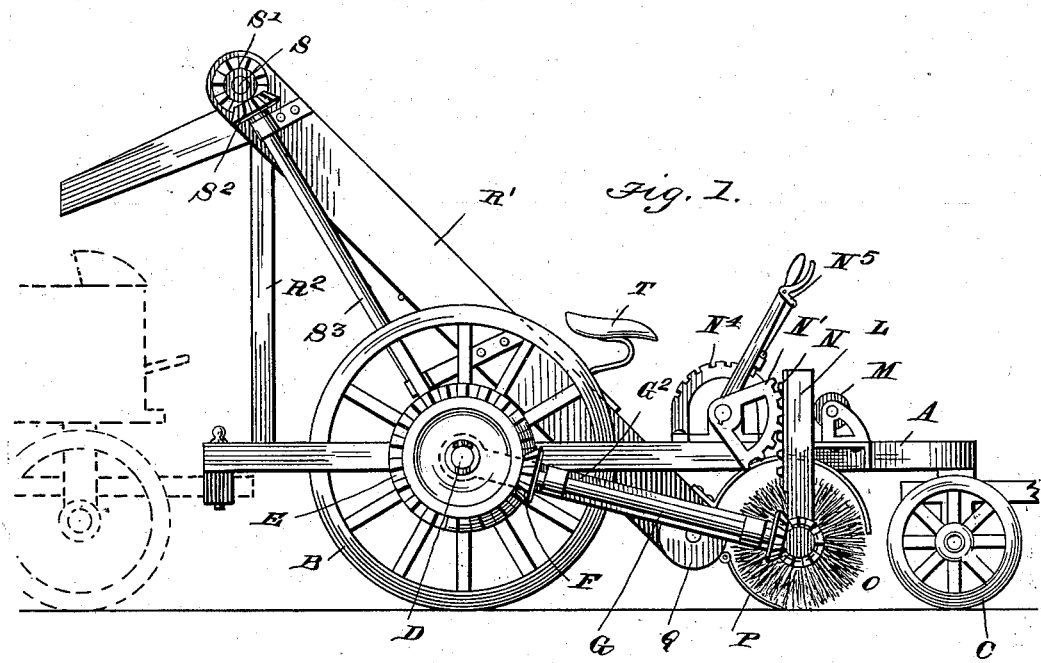
Figure 2:
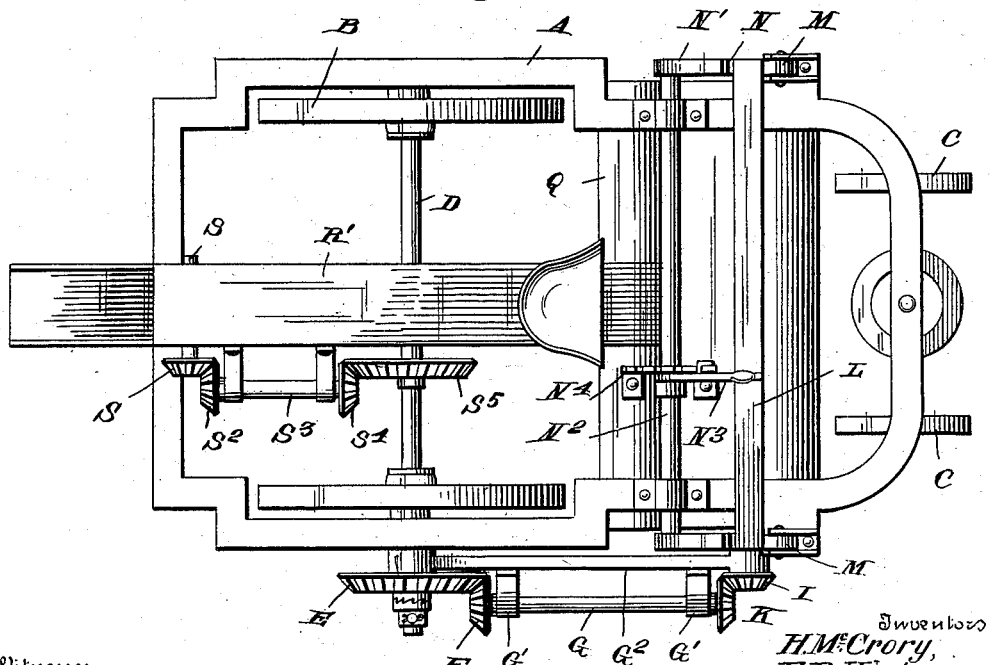

In the drawings forming part of this specification, Figure 1 is a side elevation of our improved sweeper and dirt-remover, the cart or wagon to which it is attached being shown in dotted lines. Fig. 2 is a top plan view of the same. Fig. 3 is a detail view of a brush, conveyer, and operating mechanism. Fig. 4 is a sectional view on the line 4 4 of Fig. 3.

In carrying out our invention we employ a main frame A, supported upon the rear wheels B and the front wheels C, said front wheels being pivotally connected to the main frame in the usual manner for the purpose of guiding the device. The main frame is coupled at its rear end to a running-gear of a dirt cart or receptacle. The rear wheels B are mounted upon the axle D, which carries a beveled gear E upon its outer end, said beveled gear meshing with a beveled gear F, mounted upon the rear end of a shaft G, journaled in bearings G', rigidly attached to a bar $G^2$, which is loosely suspended from the end of the axle D, the opposite end of said bar being supported by the brush-axle H. A beveled gear I is mounted upon the end of the brush-axle and meshes with a beveled gear K, carried upon the forward end of the shaft G. The brush-shaft H is journaled in a yoke L, the vertical members of which work up and down upon the exterior of the main frame, said vertical members bearing against the antifriction-rollers M on one side and provided with rack-teeth N upon the opposite side, which teeth are engaged by the toothed segments N', carried upon the ends of the shaft $N^2$, said shaft being operated by means of a hand-lever $N^3$ for the purpose of raising or lowering the yoke, and consequently the rotary brush. The lever is held in its proper position by means of a segment $N^4$ and catch $N^5$. The rollers M are journaled in the same horizontal plane with the shaft $N^2$, so that their peripheries engage with the smooth sides of the yoke directly opposite the point of engagement therewith by the toothed segment N'. This location and arrangement of the rollers and segments in relation to the yoke permits of the lower end of the yoke being moved in the arc of a circle at the forward end of the bar $G^2$ as it is moved up and down to adjust the position of the brush. A curved plate P is arranged directly beneath and to the rear of the brush O for the purpose of receiving the dirt and directing the same into a trough Q, which extends transversely beneath the main frame and directly to the rear of the rotary brush, and located in said trough is a screw conveyer Q', having flights arranged in opposite directions upon opposite sides of the center of the said trough, so that all of the dirt is fed directly to the center, whence it is elevated by means of an endless belt R', traveling in a chute R', which extends upwardly and rearwardly and is supported at its rear end by means of a brace $R^2$. The upper end of the endless belt passes over a shaft S, carrying a beveled gear S' upon its outer end, which gear in turn meshes with a bevel gear $S^2$, mounted upon an inclined shaft $S^3$, journaled in bearings attached to the side of the chute R', the lower end of said shaft having a bevel gear $S^4$, which meshes with a bevel gear $S^5$, mounted upon the axle or shaft D. The driver's seat is attached to the chute R', or it may be supported upon the main frame in any suitable manner.

By means of the construction herein described it will be clearly understood that as the device is drawn or propelled forwardly the rotary brush will be revolved, sweeping the dirt into the trough which extends the entire width of the device, and by means of the conveyer arranged within this trough all of the dirt is carried to a center of the trough and from there carried up through the chute and delivered into the cart, wagon, or other receptacle.

It will be noted that we are enabled to use a very small delivery-chute. Furthermore, it will be noticed that the brush can be raised or lowered, as desired, and with it all of the belting mechanism.

A suitable clutch is arranged upon the trough-axle in order that the machine may be backed without reversing the movement of the mechanism.

Having thus fully described our invention, what we claim as new, and desire to secure by Letters Patent of the United States, is—

In a street-cleaner, the combination, with a wheeled support, the rear axle of which is provided with a gear-wheel, a vertically-movable yoke on the support, the vertical members of which are toothed upon one side, a shaft journaled upon the support, the ends of which are each provided with a toothed segment in position to engage with the toothed portion of the yoke, a lever for rotating the shaft, an antifriction-roller in engagement with the smooth side of each vertical yoke member opposite the segment, the axes of the rollers being in substantially the same horizontal plane with the shaft, a brush journaled in the lower ends of the yoke provided with a gear-wheel, a bar loosely mounted upon the axle at one end adjacent to the gear-wheel and upon the shaft-axle adjacent to the gear-wheel at the other end, a shaft journaled upon said bar, each end of which is provided with a pinion to engage with the gear-wheels on the axle and the brush respectively, and a conveyer and an elevator to the rear of the brush.

HENRY McCRORY.
FRANK B. HINKSON.

Witnesses:
W. A. McDEVITT,
GEO. W. JACOBS.